Jan. 1, 1963
R. T. WILLIAMS ETAL
3,070,878
METHOD FOR WELDING METALLIC GAUZE
Original Filed Jan. 21, 1958
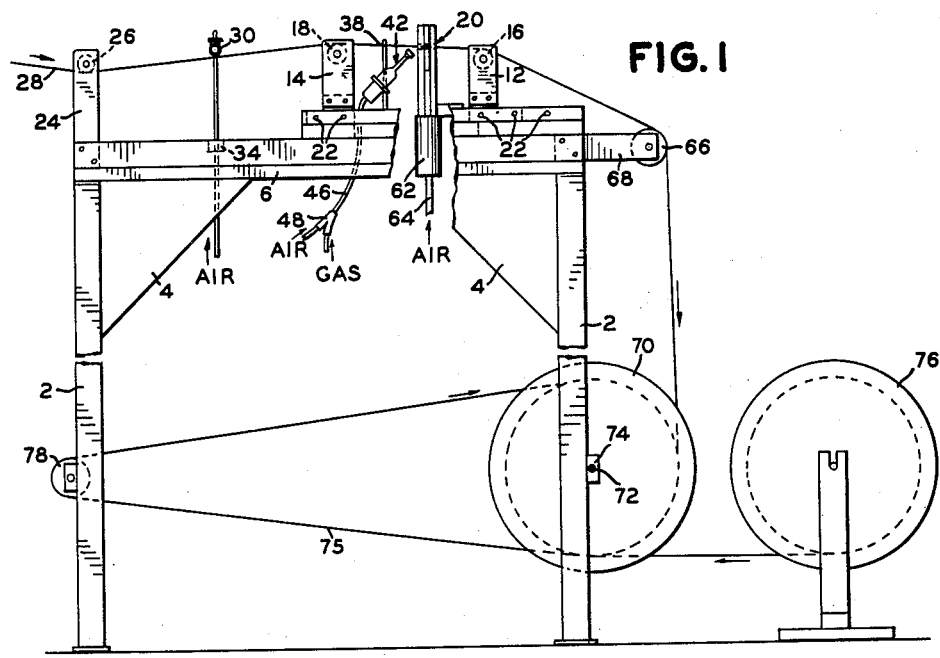
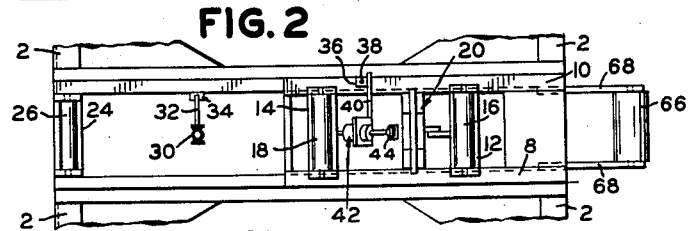
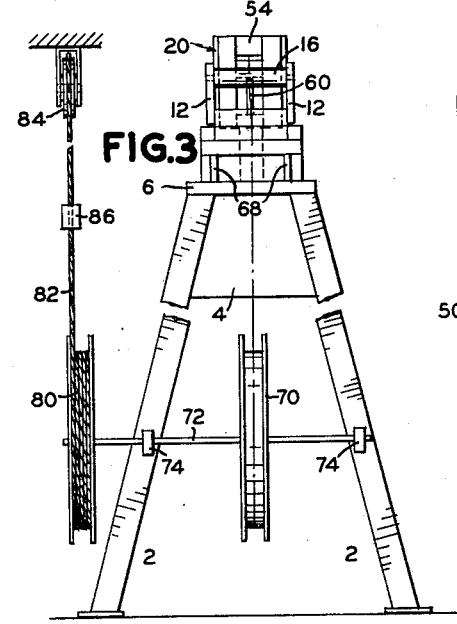
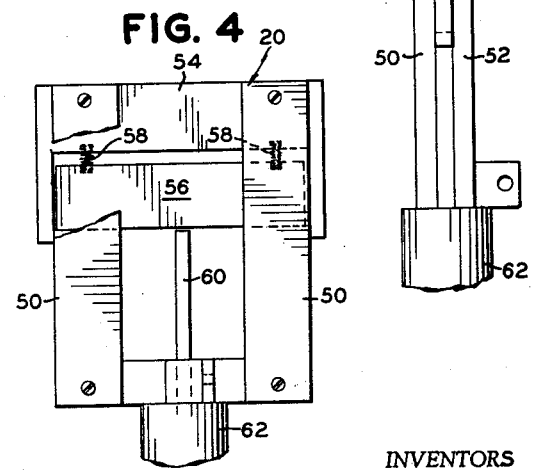
INVENTORS
RALPH T. WILLIAMS
DOUGLAS W. ELEY
BY
ATTORNEYS

United States Patent Office 3,070,878
Patented Jan. 1, 1963

3,070,878
METHOD FOR WELDING METALLIC GAUZE
Ralph T. Williams, Toronto, Ontario, and Douglas W. Eley, Willowdale, Ontario, Canada, assignors to Engelhard Industries of Canada Limited, Toronto, Ontario, Canada, a corporation of Ontario
Original application Jan. 21, 1958, Ser. No. 710,273. Divided and this application May 25, 1959, Ser. No. 815,632
6 Claims. (Cl. 29—419)

This invention relates to a welding method and, more particularly, relates to a welding method for welding the warp and weft strands of metallic gauze.

Metallic gauze, such as platinum gauze for example, is extensively used for many industrial applications, such as a catalytic material for the production of hydrogen peroxide. One such metallic gauze consists of platinum, or platinum alloy, warp and weft strands and the gauze may have 22 warp strands, equidistantly spaced and having a total width of 1$\frac{1}{16}$ inches. The weft strands are equidistantly spaced seven to the inch, and the platinum strands may have a diameter of the order of 0.0048 inch. It is necessary to weld the warp and weft strands at each intersection in the gauze, and it is necessary that this welding be accomplished by means which is rapid in operation in order that the heat imparted to the gauze is not removed therefrom by the welding apparatus, and in this connection it has been found that welding devices which incorporate rolls, through which the gauze is passed, are completely unsuitable due to the fact that the rolls conduct away an excessive amount of heat and the desirable welding characteristics are not obtained.

In accordance with the present invention, an automatic welding device is provided for the welding of metallic gauze, such as platinum gauze, for example, in which the welding operation is effected in a substantially instantaneous manner, the welds being effected by means of an impact device which does not conduct away excessive heat from the preheated gauze, and thereby effects strong uniform welds at all of the intersections of the warp and weft strands of the gauze material.

The platinum gauze or tape to be welded is woven on a conventional weaving machine which can be used to weave either cloth or fine metallic strands. In the weaving process, the gauze is interwoven with cotton fibres, and upon leaving the loom, the gauze is maintained under constant tension and the cotton fibres are ignited, thus leaving the platinum braid, or gauze, exposed. The platinum gauze or braid is then preheated by any suitable means, such as a gas flame, electrical resistance, or high frequency induction, to a dull red heat and is then passed through a pulsating air hammer which effects the desired welding of the warp and weft strands. The instantaneous application of pressure obtained by the air hammer technique, permits the wire intersections to become welded, since the action of the air hammer is sufficiently rapid to eliminate the dissipation of heat from the gauze or braid to the hammer. The air hammer could, of course, be replaced with any similar hammer means such as an electric hammer, or a mechanically actuated hammer, or the like.

Before passing the braid through the air hammer, it is necessary that the braid be preheated to a temperature such that the desired welds can be obtained by impact and thus the gauze is preheated to a temperature in the range of about 1700 to 1900° F. The gauze may be passed through the air hammer at the rate of about 0.5 to 2.0 feet per minute, and is welded by means of the impact hammer, the blade of the hammer pulsating at the rate of 3500 to 9000 strokes per minute, preferably about 5000 strokes per minute. It is, of course, possible to feed the gauze through the hammer at any desired rate, providing the action of the movable blade on the hammer is sufficiently rapid that all of the intersections of the warp and weft strands are subjected to the impact of the hammer so that each joint receives a strong uniform weld.

Referring to the accompanying drawings in which one embodiment of the welding apparatus of the present invention is shown, FIGURE 1 is a view in elevation of the welding apparatus showing the tensioning roll removed, FIGURE 2 is a plan view of the apparatus of FIGURE 1, showing the gauze removed therefrom, FIGURE 3 is an end view of the apparatus of FIGURE 1, with the end roll removed, FIGURE 4 is a detailed view in elevation of the air hammer employed, and FIGURE 5 is a side view of the air hammer shown in FIGURE 4.

Referring to FIGURE 1 of the drawings, the device includes the frame members 2, which may be fabricated, if desired, from angle iron, having the reinforcing webs 4 secured thereto by any suitable means such as welding. A base member 6 is secured to the top of the frame which supports a pair of guides 8 and 10, which may be made of cold rolled steel, if desired, these guides forming a track upon which is mounted the roll supports 12 and 14 which support the guide rolls 16 and 18 respectively. The guides 8 and 10 also support the welding head 20. The roll supports 12 and 14 and the welding head 20 may be locked in any desired position on the guides 8 and 10 by means of the set screws 22.

A roll support 24 is mounted on the left-hand end of the base 6 and supports the guide roll 26 near the upper end thereof. The platinum tape or gauze 28 to be welded, passes beneath the roll 26 and beneath, and out of contact with, a $\frac{1}{8}$" standard T 30 having holes drilled in the bottom thereof. The T is mounted on a pipe 32, shown in FIGURE 2, the pipe 32 being secured to the frame 6 by any suitable means such as the support member 34, the pipe 32 being connected at its lower end to a source of air under pressure, not shown.

A plate 36 is secured to the guide member 10 and supports a vertical arm 38 having the cross arm 40 connected thereto, the cross arm 40 supporting a gas burner 42 having a rectangular burner head 44 thereon, the burner head being of sufficient width so that the tape or gauze 28 passing above is completely and uniformly heated by the gas flame issuing from the burner head 44. A suitable combustible mixture of air and a gas, such as natural gas, methane, propane or acetylene gas, is passed into the burner 42 through the hose 46, air and gas being passed into the Y connection 48 from suitable sources, not shown.

The welding head 20 is secured to the guides 8 and 10 by any suitable means such as set screws, and includes the plate members 50 and 52, best seen in FIGURES 4 and 5, which serve to support the upper fixed blade 54 therebetween, and the movable spring loaded blade 56, the springs 58 tending at all times to divert the lower movable blade away from the fixed upper blade. The lower blade is actuated by means of a rod 60 which is connected to a piston, not shown, within the cylinder 62. In the embodiment shown, the cylinder is a conventional pin riveter having a piston travel of $\frac{5}{8}$ inch.

All parts of the welding head other than the welding blades may be fabricated from cold rolled steel, if desired, while the blades themselves may be fabricated from hardened tool steel. When welding platinum wire having a diameter of 0.0048 inch, the blades may have a clearance when closed of 0.004 inch.

Air is supplied to the cylinder 62 through a suitable conduit 64 which is connected to any suitable source of air under pressure, not shown.

A guide roll 66 is mounted on the right-hand end of the base member 6, and is supported by means of the roll supports 68, and the finished gauze is wound on a drum 70 which is supported on the frame members 2 by the shaft 72 which is mounted in the shaft hangers 74. The finished welded gauze is wound on the drum 70, interleaved with the paper 75, which is fed from the roll 76 and over the guide roll 78.

A tensioning device is also used to exert a constant tension on the gauze being welded, the tensioning device consisting of the drum 80 which is keyed to the shaft 72. The drum 80 has a cord or cable 82 wound thereon which passes over a pulley 84 and has the counterweight 86 secured to the free end thereof, whereby the counterweight acts to exert a tension on the gauze being wound on the spool 70.

In the operation of the device of the invention, the platinum braid or gauze, being interwoven with cotton fibres, is passed from the loom beneath the roll 26, and as soon as the braid has passed beneath the roll 26, the cotton fibres are ignited by means of a gas burner or similar igniting device, not shown. The braid then passes beneath the drilled T 30 and the air blast issuing from the drilled T serves to remove all cotton ashes from the gauze. The gauze then passes over the roll 18 and over the burner head 44, which uniformly heats the gauze to a dull red heat, after which the heated gauze passes through the welding head 20 and is impact welded between the fixed blade 54 and the movable blade 56. The welded gauze then passes over the guide rolls 16 and 66, and is wound on the drum or spool 70, being interleaved with a paper strip 75. Tension is maintained at all times on the gauze being welded by means of the drum 80, the cord 82, and the counterweight 86.

The device of the invention thus provides an automatic means for the welding of metal gauzes, and while the device has been described particularly in connection with the welding of platinum braid or gauze, it obviously is applicable to the welding of many other similar materials.

It will be obvious to those skilled in the art that many modifications may be made within the scope of the present invention without departing from the spirit thereof, and the invention includes all such modifications.

This application is a division of copending application Serial No. 710,273, filed January 21, 1958.

What is claimed is:

1. A method for welding metal gauze comprising moving the gauze relative to the opposed blades of a reciprocating hammer, applying heat to the moving gauze to raise its temperature to within the range of about 1700° F. to 1900° F., and rapidly hammering the gauze at a rate of 3500 to 9000 strokes per minute immediately following the application of heat over a narrow area extending transverse to the direction of movement of the gauze.

2. A method for welding metallic gauze comprising the steps of moving the gauze relative to the opposed blades of a reciprocating hammer, raising the temperature of the gauze to a dull red heat within the temperature range of about 170° F. to 1900° F., and rapidly hammering the gauze at a rate of 3500 to 9000 strokes per minute over a narrow area extending transverse to the direction of movement of the gauze before the gauze cools down appreciably.

3. A method for welding metallic gauze comprising steps of moving the gauze relative to the opposed blades of a reciprocating hammer, heating the gauze to a temperature within the range of about 1700° F. to 1900° F., and hammering the gauze at a rate of 3500 to 9000 strokes per minute over a narrow area extending transverse to the direction of movement of the gauze immediately following the application of heat.

4. A method for forming welded metallic gauze comprising interweaving metal strands and combustible fibers into a metallic gauze, burning the combustible fibers included in the metallic gauze, removing the burned fibers from the gauze, heating the gauze to a dull red heat within the temperature range of about 1700° F. to 1900° F., and hammering the gauze at a rate of 3500 to 9000 strokes per minute over a narrow area extending transverse to the direction of movement of the gauze before the gauze cools appreciably.

5. A method for welding a metallic gauze which is interwoven with organic fibers, which comprises igniting the fibers in moving metallic gauze, removing ashes of the fibers from the gauze, heating the moving metallic gauze to a welding temperature, and very rapidly hammering the moving gauze before the gauze cools down appreciably over a narrow area extending transverse to the direction of movement of the gauze, the hammering being sufficiently rapid to weld the metallic gauze.

6. A method for welding metallic gauze which comprises heating metallic gauze to raise its temperature to a welding temperature, and very rapidly hammering the metallic gauze while moving before the gauze cools down appreciably over a narrow area extending transverse to the direction of movement of the gauze, the hammering being sufficiently rapid to weld the metallic gauze.

References Cited in the file of this patent
UNITED STATES PATENTS

| | | |
|---|---|---|
| 854,099 | Mead | May 21, 1907 |
| 943,438 | Mead | Dec. 14, 1909 |
| 949,860 | Taylor | Feb. 22, 1910 |
| 1,489,153 | Robinoff | Apr. 1, 1924 |
| 2,122,604 | Bridges | July 5, 1938 |
| 2,178,633 | Hooper | Nov. 7, 1939 |
| 2,572,956 | Servis | Oct. 30, 1951 |
| 2,648,792 | Wylie | Aug. 11, 1953 |